Aug. 5, 1924. 1,504,005
J. J. VIENNEAU
COIL WINDING MACHINE
Filed June 1, 1922
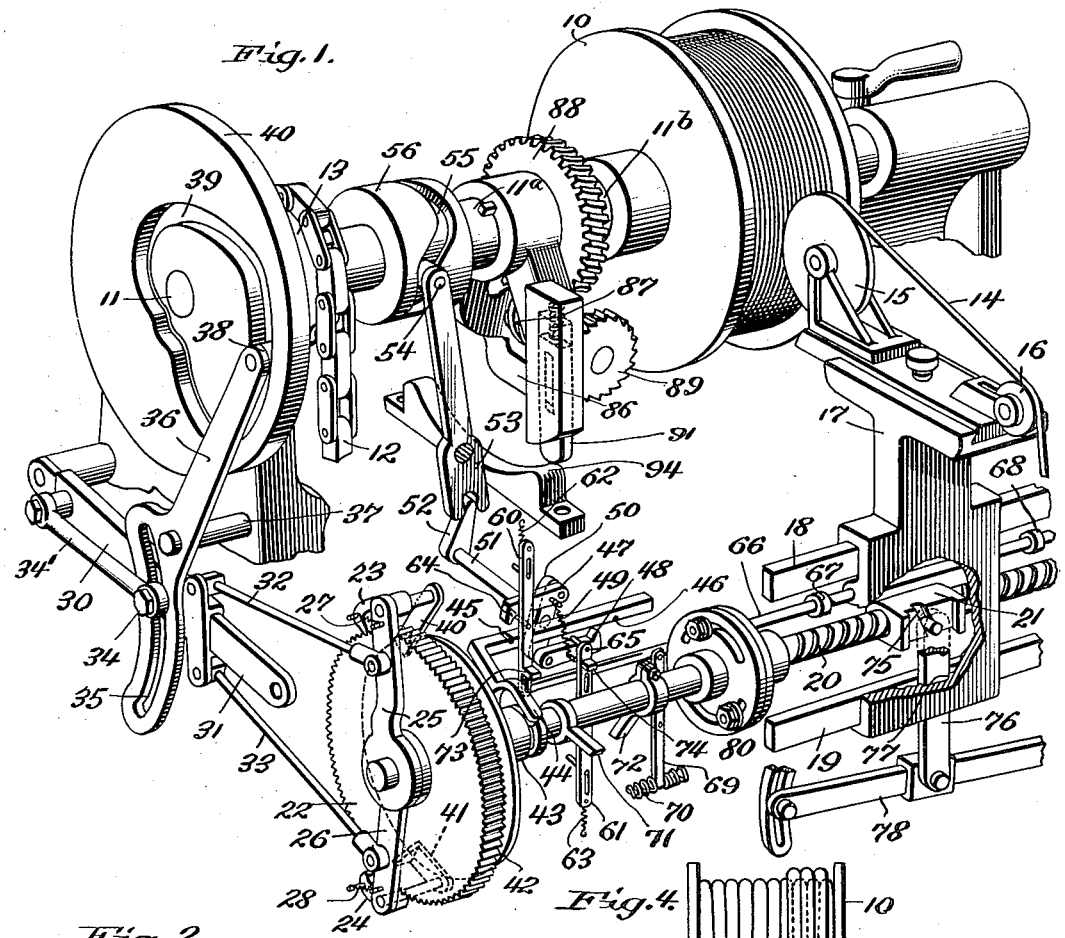
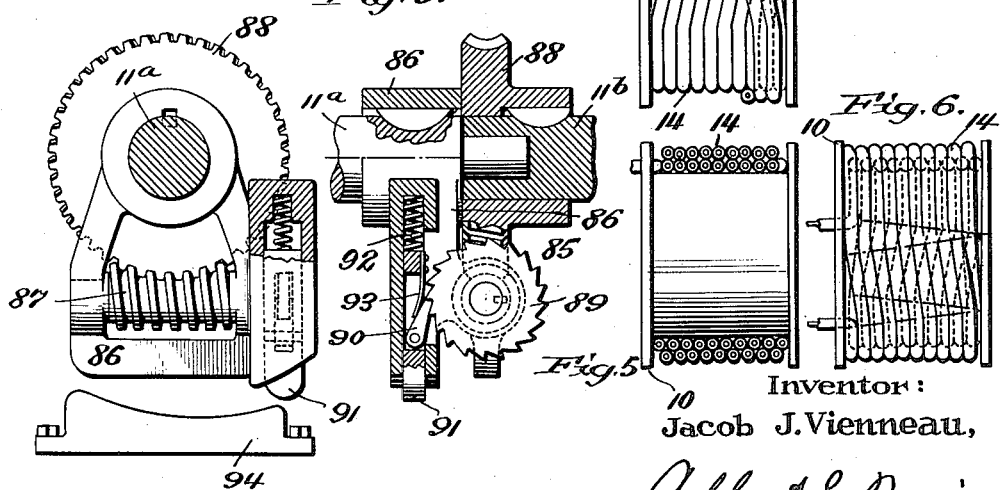
Inventor:
Jacob J. Vienneau,
by Albert G. Davis
His Attorney Patented Aug. 5, 1924.

1,504,005

UNITED STATES PATENT OFFICE.

JACOB J. VIENNEAU, OF PITTSFIELD, MASSACHUSETTS, ASSIGNOR TO GENERAL ELECTRIC COMPANY, A CORPORATION OF NEW YORK.

COIL-WINDING MACHINE.

Application filed June 1, 1922. Serial No. 565,204.

*To all whom it may concern:*

Be it known that I, JACOB J. VIENNEAU, a citizen of the United States, residing at Pittsfield, in the county of Berkshire, State of Massachusetts, have invented certain new and useful Improvements in Coil-Winding Machines, of which the following is a specification.

My invention relates to coil winding machines and has for its object the provision of means whereby the uniformity and symmetry of the winding may be improved.

More specifically, my invention relates to automatic machines for winding electrical conductors and the like into coils. My invention is particularly applicable to the winding of transformer coils, field coils, etc. In order to make a more compact and uniform winding, it is common to wind each turn along a circumference of the spool rather than in the form of a helix. When winding coils in this manner the conductor is shifted at the end of each turn into the next succeeding turn and at the end of each layer the shifting movement is reversed for the next layer. When the turns of each layer are wound in the gutter between the turn of the preceding layer as when using the coil winding machine disclosed in my copending application, Serial No. 565,203, filed June 1, 1922, the cross-overs from one turn to the next form a raised portion along one side of the coil, making the coil lop-sided.

In carrying out my present invention I have provided means for distributing the cross-overs uniformly around the periphery of the coil, thus making a uniform and symmetrical winding. In one embodiment of my invention, I provide means for controlling the movement of the spool so as to bring the cross-over at a different point in each turn.

For a better understanding of my invention reference should be had to the accompanying drawing in which Fig. 1 is a partial view in perspective of an automatic coil winding machine embodying my invention; Fig. 2 is an elevation view partially in section of the automatic means for shifting the spool; Fig. 3 is a side elevation of Fig. 2 partially in section; Fig. 4 is a view showing a common form of winding; Fig. 5 is a sectional view of Fig. 4; while Fig. 6 is a plan view showing a winding made in accordance with my invention.

Referring to Fig. 1 of the drawing, although I have shown my invention embodied in a specific type of automatic coil winding machine the details of which form no part of my invention, it will be obvious that it may be applied to various types of coil winding machines. In the specific mechanism shown the spool 10 is carried on a shaft 11 which is driven from a suitable source of power by means of a chain 12 cooperating with a sprocket wheel 13 secured to the shaft. The spool may be releasably secured to the shaft 11 so that it may be removed upon the completion of the winding operation or the spool may be arranged in parts to permit the removal of the coil from the spool after being wound. As shown in the drawing the electric conductor 14, or other material, is guided over two rollers 15 and 16 so as to be wound in layers on spool 10 as it is rotated. The guiding rollers 15 and 16 are carried on a suitable frame 17 which is constrained to move on guiding bars 18 and 19 in a direction parallel with the axis of shaft 11.

The frame 17 is commonly moved by an amount equal to the diameter of the conductor upon the completion of each turn whereby the conductor 14 is shifted into the next turn, each turn lying in a plane perpendicular to the axis of the coil or in other words, along a circumference of the coil. A winding is thus formed of the type shown in Fig. 5. This periodic shifting movement is transmitted to the frame through a screw shaft 20 cooperating with a suitable nut 21 operatively connected to the frame. A ratchet driving wheel 22 is secured to the left-hand end of shaft 20, and cooperating with the ratchet wheel are pawls 23 and 24, one or the other of which is adapted to engage the ratchet wheel depending on the direction in which the frame 17 is being moved. The pawls 23 and 24 are pivotally mounted on arms 25 and 26, which are in turn pivotally mounted on shaft 20, and are biased to positions to engage ratchet wheel 22 by means of spiral springs 27 and 28. Arms 25 and 26 are operatively connected to a slider 30 moving on a guide 31 by means of links 32 and 33. Attached to slider 30 is an adjustable pin 34 which extends through an arc-shaped slot 35 in a lever 36 pivoted on a fixed post 37. The pin 34 is shown secured on the end of an arm 34' which is adjustable about its point of support on slider 30, whereby pin 34 can be adjusted in slot 35. On the upper end of lever 36 is a suitable roller or pin 38 which moves in a cam slot 39 in a disk 40 secured to the end of shaft 11. The cam slot 39 is formed in such manner that as shaft 11 is rotated, lever 36 will be rocked about its pivot, its movement being transmitted to slider 30 and through links 32 and 33 to arms 25 and 26 so that the ratchet driving wheel 22 will be rotated periodically through a small arc once each revolution of shaft 11 in a direction depending on which pawl 23 or 24 is in engagement with it. Frame 17 is thus moved once each turn of spool 10 to shift the conductor into the next succeeding turn. The amount of this shifting movement can be regulated to correspond with the size of the conductor by varying the movement given slider 30 by means of the adjustment provided for pin 34 in slot 35.

For the purpose of controlling the engagement of pawls 23 and 24 with the ratchet wheel, the pawls are provided with actuating arms 40 and 41 having cam faces which are adapted to engage with opposite sides of a disk 42 carried by a sleeve 43 loosely mounted on shaft 20. When disk 42 is in the position shown in the drawing, it engages arm 41, holding pawl 24 out of engagement with ratchet wheel 22, while arm 40 is free whereby pawl 23 is held in engagement with the ratchet by spring 27. When disk 42 is moved to the left it will engage arm 40, lifting pawl 23, and free arm 41, whereby pawl 24 is moved into engagement with the ratchet wheel by spring 28. The position of disk 42 is controlled by means of a yoke 44 cooperating with sleeve 43 and provided with a portion parallel with shaft 20 in which are nicks 45 and 46. Pawls 47 and 48 are provided adjacent opposite sides of this extension yoke 44 and are biased toward it so as to cooperate with nicks 45 and 46 respectively by a spiral spring 49. These pawls are carried on an arm 50 secured at its center at right angles to a shaft 51 which also carries an arm 52 cooperating with a lever 53. On the opposite end of lever 53 is a pin 54 which moves in a cam 55 in a collar 56 rigidly secured to shaft 11. The cam groove 55 is generated so that arm 53 is rocked in a clockwise direction once each revolution of shaft 11, which movement is transmitted through shaft 51 to the pawls 47 and 48.

Adjacent pawls 47 and 48 are upright bars 60 and 61 which are biased in upward and downward directions respectively by spiral springs 62 and 63. On the bars 60 and 61 are pins 64 and 65 lying in the path of pawls 47 and 48 so as to normally hold the pawls out of nicks 45 and 46. The arms 60 and 61 are operatively connected through pin and slot connections to a transverse rod 66 extending parallel with shaft 20 and through frame 17. On the rod 66 are adjustable collars or stops 67 and 68 lying on opposite sides of frame 17, one of which is in position to be engaged by the frame as it nears the completion of its movement in either direction. The rod 66 is normally biased to a central position by means of a lever 69 provided with a centering spring 70. Rigidly secured to shaft 20 are adjustable arms 71 and 72 which are adapted to cooperate respectively with projections 73 and 74 carried by bars 60 and 61 when rod 66 is moved by frame 17. The distance between projections 73 and 74 is considerably less than the distance between arms 71 and 72. The projections are normally biased by centering spring 70 in a central position between the arms so as not to be engaged thereby as shaft 20 rotates.

The operation if this reversing mechanism is as follows: Upon the completion of a layer of the winding in spool 10, frame 17 will engage one or the other of stops 67 and 68 giving rod 66 movement of translation so as to bring one or the other of projections 73 and 74 in position to be engaged by its corresponding arm 71 or 72. Assuming for example, that rod 66 is moved toward the left, arm 71 will engage projection 73 depressing upright bar 60 upon the next rotative shifting movement transmitted to shaft 20. This releases pawl 47 which will be moved by a spring 49 into nick 45 and upon the rocking of lever 53 in a clockwise direction during the next turn will be actuated to move yoke 44 and hence disk 42 toward the left. Pawl 24 is thus released and pawl 23 lifted so that the next shifting movement at the end of the turn will be given to frame 17 by pawl 24 and will be in the opposite direction, being the beginning of the next layer of the winding. Frame 17 will then disengage stop 68 which is thereupon moved by centering spring 70 toward the left to its original central position in which projections 73 and 74 are between arms 71 and 72.

The driving nut 21 is provided with an oblique groove 75, cooperating with which is a pin carried by the end of an upright bar 76, moving in a guide 77 in frame 17 and cooperating at its lower end with a guiding bar 78. The bar 76 thus forms the operating connection between nut 21 and frame 17. By adjusting bar 78 at an angle with guide bar 19, the arm 76 may be given movement of translation in its guide 77 as frame 17 is moved. In such case it will be observed that frame 17 will be given a slight movement independently of nut 21 due to the effect of the oblique slot 75, and the direction and amount of this movement will depend on the direction and amount of the angle at which guide 78 is set with relation to guide 19. This independent movement of frame 17 is provided for more accurate adjustment for the width of the conductor than can be made by adjusting pin 34 in slot 35.

Interposed in the driving shaft 20 is a lost motion coupling or connection 80, described and claimed in my aforesaid copending application, by means of which the turns of each layer may be wound in the gutter between the turns of the preceding layers.

When using the automatic winding machine previously described, which forms no part of my present invention, for winding round conductors so that the turns fall in the gutters between the turns of the preceding layer, the cross-overs will form a raised portion along one side of the coil, as shown in Figs. 4 and 5. This is due to the fact that the cross-overs are all made at the same point along the periphery of the coil and hence pile up one above the other. In carrying out my present invention, I have provided means for automatically giving the spool a slight movement each revolution independently of the driving means. Referring to Figs. 2 and 3, in one form of my invention I have provided an adjustable coupling 85, interposed in driving shaft 11. The driving shaft 11 is divided into two sections 11$^a$ and 11$^b$, one of which is provided with a trunnion which fits in a corresponding recess in the other part, thus maintaining the section in alinement. Secured to the end of section 11$^a$ is an arm 86 carrying a worm 87 which extends at right angles to the axis of shaft 11. This worm cooperates with a worm gear 88 secured to the end of section 11$^b$. On the shaft of worm 87 is a ratchet wheel 89 cooperating with which is a pawl 90 secured to a slider 91. The slider 91 is held in suitable guides in arm 86 and is biased downward by means of a spiral spring 92. The pawl 90 is biased into engagement with ratchet wheel 89 by means of a flat spring 93. The lower end of the slider 91 is rounded and adapted to engage once each revolution of shaft 11 with a stationary cam 94 which is generated so as to give the slider gradually an upward movement (Fig. 2) whereby the ratchet wheel 89 is given a slight rotative movement by pawl 90. In this manner section 11$^b$ of shaft 11, carrying the spool 10, may be given a slight rotative movement over each revolution independently of the other parts of the machine, and whereby the velocity of rotation of the spool is temporarily changed. The specific arrangement shown is such that this movement will be in a direction to slightly retard the spool 10, whereby the cross-over of each turn will be made slightly before or earlier than the cross-over of the preceding turn. As shown in Fig. 6, the cross-overs will thus be distributed around the periphery of the coil, and it will be observed that the zone of the cross-overs takes a zig-zag course around the periphery of the coil. A uniform and symmetrical winding is thus formed.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. A coil winding machine for electrical conductors and the like comprising in combination with a spool, means for rotating said spool and feeding said conductor along a circumference of said spool, means for shifting said feeding means from one turn to the next forming a cross-over, and auxiliary means for controlling the rotation of said spool so as to cause said cross-overs to be distributed uniformly around said coil.

2. A coil winding machine for electrical conductors and the like comprising in combination with a spool, means for rotating said spool and for feeding said conductor along a predetermined circumference of said spool, means for shifting said feeding means from one turn to the next, and means for temporarily changing the velocity of rotation of said spool so as to bring said shifting movement at a different point on each turn.

3. A coil winding machine for electrical conductors and the like comprising in combination with a spool, means for rotating said spool and for feeding said conductor along a predetermined circumference of said spool, means for shifting said feeding means from one turn to the next forming a cross-over, and means for changing the operating relation of said rotating means and said shifting means each turn so as to bring said cross-over at a different point on each turn.

4. A coil winding machine for electrical conductors and the like comprising in combination with a spool, means for rotating said spool and for feeding said conductor along a predetermined circumference of said spool, means for shifting said feeding means from one turn to the next forming a cross-over, and means acting each turn to retard said spool whereby said cross-overs are distributed around the periphery thereof.

5. A coil winding machine for electrical conductors and the like comprising in combination with a spool, a shaft for said spool divided into two sections, means for rotating said shaft and for feeding said conductor along a circumference of said spool, means for shifting said feeding means from one turn to the next forming a cross-over, a stationary cam, an operating connection between said sections, and means carried by said shaft adapted to engage said cam and cooperating with said operating connection so as to give the sections of said shaft relative angular movement each revolution whereby said cross-over is made at a different point on each turn.

6. A coil winding machine for electrical conductors and the like comprising in combination with a spool, a shaft for said spool divided into two sections, means for rotating said shaft and for feeding said conductor along a circumference of said spool, means for shifting said feeding means from one turn to the next forming a cross-over, a worm gear on one of the sections of said shaft, a worm cooperating therewith carried by the other section of said shaft, a ratchet driving wheel secured to said worm, a stationary cam, a slider adapted to engage said cam upon rotation of said shaft, and a pawl carried by said slider cooperating with said ratchet wheel, whereby the sections of said shaft are given relative angular movement each revolution so as to bring said cross-over at a different point on each turn.

7. In the winding of gutter-wound coils, the method of distributing the crossovers which consists in crossing over from one turn to the next at different points of the various turns whereby the crossovers are distributed around the coil.

8. In the winding of gutter-wound coils, the method of distributing the crossovers which consists in crossing over from one turn to the next at a progressively earlier point in each successive turn whereby the crossovers are distributed uniformly around the coil.

In witness whereof, I have hereunto set my hand this 29th day of May, 1922.

JACOB J. VIENNEAU.